United States Patent
Fingerman et al.

(10) Patent No.: US 9,540,937 B2
(45) Date of Patent: Jan. 10, 2017

(54) STATOR FOR TORQUE CONVERTER

(71) Applicants: Michael Fingerman, West Bloomfield, MI (US); Darrin C Raley, Clarkston, MI (US); Prashant Modi, Rochester, MI (US); Marvin G Schiemann, Bloomfield Hills, MI (US)

(72) Inventors: Michael Fingerman, West Bloomfield, MI (US); Darrin C Raley, Clarkston, MI (US); Prashant Modi, Rochester, MI (US); Marvin G Schiemann, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 430 days.

(21) Appl. No.: 14/171,887

(22) Filed: Feb. 4, 2014

(65) Prior Publication Data
US 2015/0218956 A1    Aug. 6, 2015

(51) Int. Cl.
*F16D 33/00* (2006.01)
*F01D 9/02* (2006.01)
(Continued)

(52) U.S. Cl.
CPC ............... *F01D 9/02* (2013.01); *F16H 41/24* (2013.01); *F16H 41/26* (2013.01); *F16H 2041/285* (2013.01)

(58) Field of Classification Search
CPC .... F16H 2041/285; F16H 41/26; F16H 41/24; F01B 9/02; F16D 33/20
(Continued)

(56) References Cited

U.S. PATENT DOCUMENTS 6,065,287 A * 5/2000 Yamamoto ............. F16H 41/26
                                                        415/191
6,220,025 B1    4/2001 Mauti et al.
(Continued)

FOREIGN PATENT DOCUMENTS

JP          07083309        3/1995
JP          H0814356 A      1/1996
(Continued)

OTHER PUBLICATIONS

International Search Report and Written Opinion dated Jul. 22, 2015 for International Application No, PCT/US2015/013258, International Filing Date Jan. 28, 2015.

*Primary Examiner* — Michael Leslie
*Assistant Examiner* — Dustin T Nguyen
(74) *Attorney, Agent, or Firm* — Ralph E. Smith

(57) ABSTRACT

A stator for use with a torque converter includes an inner annular shell, outer annular core, a plurality of stator blades and pressure-side fluid directing projections. The plurality stator blades are disposed around the inner shell in a spaced apart configuration and radially extend to the outer core. Each stator blade includes an inlet-side edge, an opposed outlet-side edge and opposed pressure-side and suction-side surfaces extending between the inlet-side and outlet-side edges. The pressure-side fluid directing projections outwardly project from the pressure-side surface in spaced relation to each other and each extend between the inlet-side and outlet-side edges. The fluid directing projections are configured to aid in redirecting torque converter fluid returning from a turbine and reducing fluid separation as the fluid interacts with the stator blades and associated fluid directing projections thereby increasing efficiency and performance of the torque converter.

16 Claims, 8 Drawing Sheets

(51) Int. Cl.
  *F16H 41/24*  (2006.01)
  *F16H 41/26*  (2006.01)
  *F16H 41/28*  (2006.01)
(58) Field of Classification Search
  USPC ........ 60/361, 362; 416/180, 197 C; 415/186,
    415/208.2, 208.3
  See application file for complete search history.

(56) References Cited

U.S. PATENT DOCUMENTS

| | | |
|---|---|---|
| 6,996,978 B2 | 2/2006 | Goerend |
| 7,918,645 B2 | 4/2011 | McCullick et al. |
| 2011/0311367 A1 | 12/2011 | Shiomura et al. |

FOREIGN PATENT DOCUMENTS

| | | |
|---|---|---|
| JP | H10252858 A | 9/1998 |
| JP | 2009209979 A | 9/2009 |

\* cited by examiner

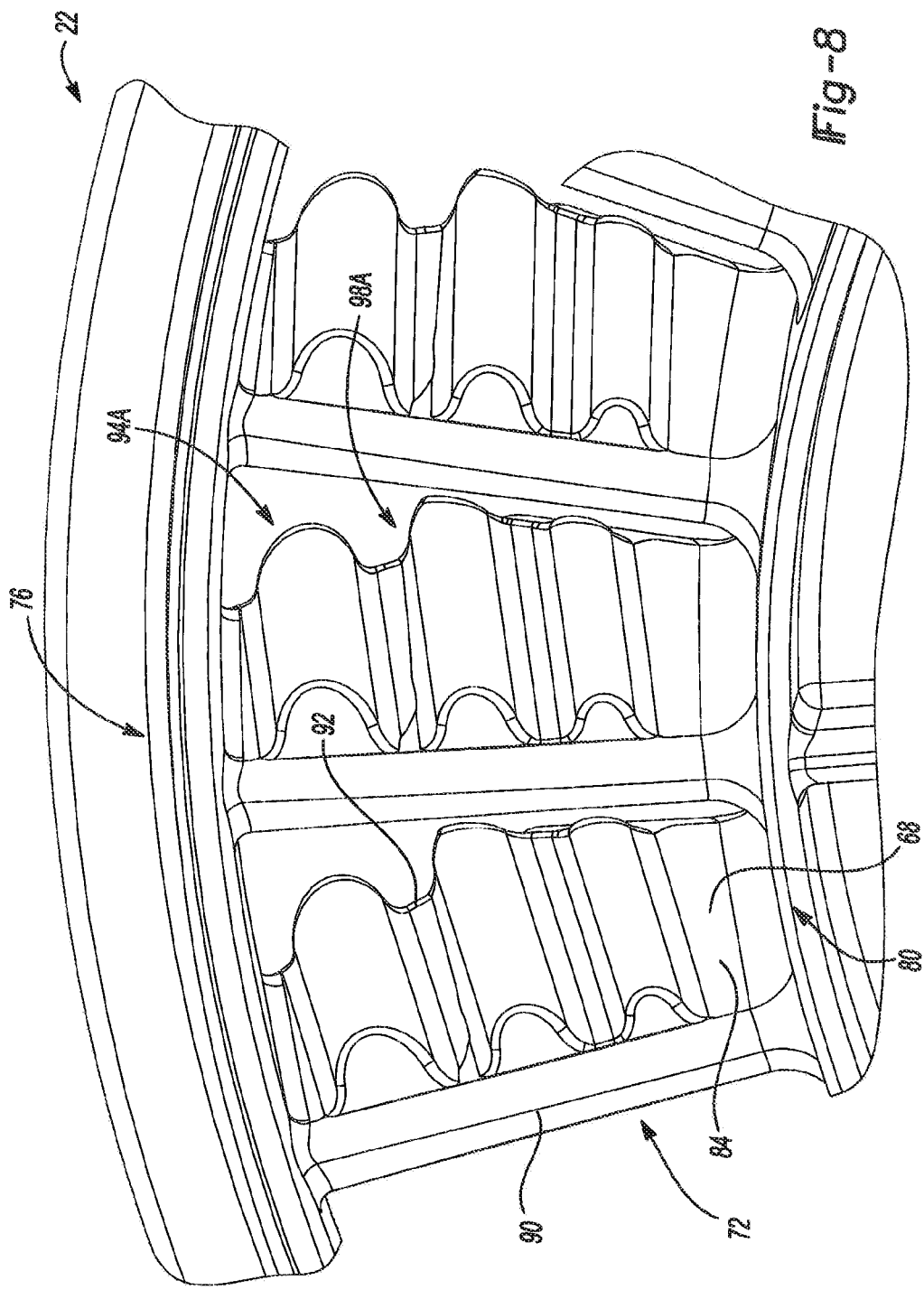

STATOR FOR TORQUE CONVERTER

FIELD

The present disclosure relates generally to a torque converter and, more particularly, to a stator for a torque converter.

BACKGROUND

Typical centrifugal type torque converters for automotive and/or industrial transmission applications include an impeller, a stator and a turbine that cooperate using hydraulic fluid to transmit energy from an input (e.g., engine) to an output (e.g., transmission). In such a torque converter, the impeller is connected to the input, the turbine is connected to the output (e.g., transmission input shaft) and the stator is connected to a reaction member (e.g., non-rotating support shaft). The stator typically includes a plurality of blades designed to change the direction of the fluid exiting the turbine and entering the impeller. Conventional stator blade designs, such as ruled blade surface designs, balance effectiveness of redirecting fluid while attempting to minimize fluid losses with moderate success. With various new automotive transmission designs (e.g., more gears for more speeds), however, less axial space is available for torque converters thereby requiring an axially shorter or more axially compact stator. With such a stator having axially shorter blades, the conventional ruled blade surface designs have been shown to increase fluid losses, thereby impacting the performance of the torque converter and potentially negatively impacting fuel economy and noise-vibration and harshness (NVH) characteristics of an associated vehicle.

SUMMARY

In one form, a stator for use with a torque converter is provided in accordance with the teachings of the present disclosure. In one exemplary implementation, the stator includes an inner annular shell, an outer annular core, a plurality of stator blades and pressure-side fluid directing projections associated with the stator blades. In this exemplary implementation, the plurality of stator blades are disposed around the inner annular shell in a spaced part configuration and radially extend to the outer annular core. Each stator blade includes an inlet-side edge, an opposed outlet-side edge, a pressure-side surface extending between the inlet-side and outlet-side edges and an opposed suction-side surface extending between the inlet-side and outlet-side edges. The pressure-side fluid directing projections outwardly project from the pressure-side surface in spaced relation to each other and each extend between the inlet-side and outlet-side edges. The fluid directing projections are adapted to aid in redirecting torque converter fluid returning from a turbine and reducing fluid separation as the fluid interacts with the stator blades and associated fluid directing projections thereby increasing efficiency and improving performance of the torque converter.

In another form, a centrifugal torque converter for a transmission is provided in accordance with the teachings of the present disclosure. In one exemplary implementation, the centrifugal torque converter includes a turbine, an impeller, a stator positioned between the turbine and the impeller and a plurality of stator blades each having a pressure-side and a suction-side fluid directing rib. The plurality of blades extend within the stator between an inner annular shell and an outer annular core. Each blade includes an inlet-side edge, an opposed outlet-side edge, a pressure-side surface extending between the inlet-side and outlet-side edges and an opposed suction-side surface extending between the inlet-side and outlet-side edges. The pressure-side and suction-side fluid directing ribs each outwardly project from the respective pressure-side and suction-side surfaces and extend between the inlet-side and outlet-side edges. The fluid directing ribs are configured to aid in redirecting torque converter fluid returning from the turbine and reducing fluid separation as the returning fluid interacts with the stator blades and associated fluid directing ribs thereby increasing efficiency and improving performance of the torque converter.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 8 is a partial view of the exemplary stator having an alternative fluid directing element configuration according to the principles of the present disclosure.

DESCRIPTION

Figure 1:
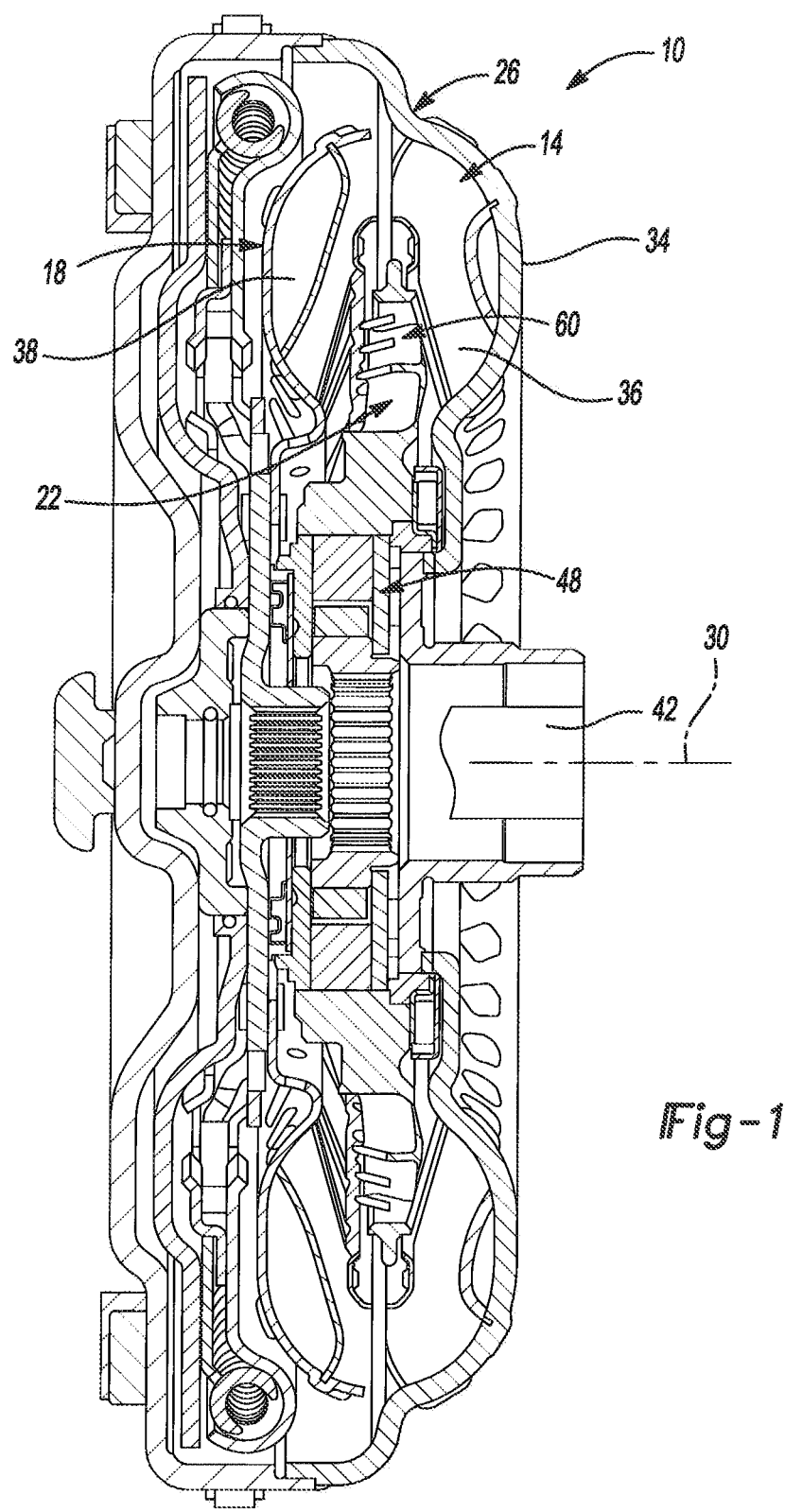
FIG. 1 is a cross-section of an exemplary torque converter having an exemplary stator with an exemplary blade configuration according to the principles of the present disclosure.

With initial reference to FIG. 1, an exemplary torque converter is shown and generally identified at reference numeral 10. As shown, the torque converter 10 is a centrifugal type torque converter that includes an impeller 14, a turbine 18 and a stator 22. In one exemplary implementation, the torque converter includes a casing or housing 26 that is coupled to an engine or other torque generating device (not specifically shown) to be rotationally driven by the engine about a central axis 30. The housing 26 of the torque converter 10 includes a wall 34 to which are coupled a series of fins or vanes 36 that function as the pump or impeller 14 for hydraulic fluid (e.g., transmission oil). Inside the housing 26 is the turbine 18, which includes fins or blades 38. The turbine 18 is typically coupled to a transmission (not shown), such as via a transmission shaft 42. As the fluid is flung from the impeller 14 through its action as a centrifugal pump, the fluid enters the blades 38 of turbine 18 causing it to spin or rotate, which in turn causes the transmission input (e.g., transmission shaft 42) to the transmission to rotate.

The hydraulic fluid exits the turbine 18 at or near its center typically moving in a different direction than when it entered the turbine 18. Upon exiting the turbine 18, the fluid interacts with the stator 22, which includes a plurality of blades configured to redirect the flow of hydraulic fluid returning to the impeller from the turbine. In certain operating conditions, such as up to the coupling point of the torque converter, the stator blades are configured to redirect the hydraulic fluid exiting the turbine before it interacts with the impeller 14 so that the returning fluid will not slow down the impeller 14 and work against the engine. The stator 22 resides at or near the center of the torque converter 10 and is coupled to a fixed member, such as a fixed transmission support shaft. In one exemplary implementation, a one-way clutch 48 couples the stator 22 to the fixed member, preventing the stator 22 from spinning up to the coupling point and allowing it to spin thereafter.

As briefly discussed above, conventional stator blade designs include a ruled blade surface, which generally requires a certain amount of axial blade length to minimize fluid losses and provide acceptable torque converter performance and efficiency. Recent powertrain developments are requiring smaller or more compact axial packaging envelopes, which, in turn, necessitate the torque converter to be axially smaller or more compact. For example, for a transversely positioned transmission that includes additional gears for additional speeds, the transmission will grow in length but may still be required to package in the same envelope because the vehicle track width is required to remain the same. As a result, the torque converter may be required to be axially smaller or more compact. These axially smaller torque converters are required to utilize a stator, such as exemplary stator 22, having a reduced axial length with shorter blades.

The ruled blade surfaces of conventional stators under the above constrained axial lengths have been shown through testing to exhibit a deterioration of performance (e.g., efficiency, torque ratio and K-factor) and a performance stability degradation. For example, the axially smaller stators have a shorter blade length with less surface area to redirect the flow of hydraulic fluid exiting the turbine. As one of ordinary skill in the art will appreciate, stator blades, such as blades with the ruled blade surfaces, are designed with a goal of minimizing fluid losses as the fluid is redirected by the blades in an effort to achieve a certain efficiency and maintain stable performance of torque converter 10.

As the hydraulic fluid exits the turbine and interacts or hits the pressure side of the stator blades at speed ratios up to the coupling point of the torque converter, a majority of the fluid is redirected. During the redirection process, however, a portion of the fluid that travels around the blade profile to the suction side of the blades is consumed in recirculation thereby resulting in fluid losses. In particular, such axially smaller conventional stator blades having less surface area were shown during testing to exhibit increased oil separation from the suction side of the blade profile, thereby increasing fluid losses and decreasing the overall efficiency and performance of the torque converter. In addition, such oil separation can cause increased turbulence of the fluid, which can result in powertrain and/or vehicle NVH that is perceivable to a vehicle occupant.

At a torque converter stall condition, for example, less stable performance of the torque converter resulting from use of the shorter axial length conventional stator blades has been found to cause an increase in engine speed, which typically increases the transmission fluid temperature. In certain operating conditions, such increased transmission temperature may lead to an overheat condition and/or a degradation in the transmission fluid properties. Furthermore, having the torque converter exhibit instability, such as discussed above, may present a scenario where it is more difficult to control overall powertrain behavior, as will be appreciated by one skilled in the relevant art.

Accordingly, the torque converter 10 includes the exemplary stator 22 having exemplary fluid directing elements 60 configured to aid in redirected the hydraulic fluid after exiting the turbine and before entering or returning to the impeller. As will be discussed in greater detail below, the fluid directing elements 60 are configured to not only more effectively redirect the fluid, but also to reduce fluid separation thereby improving torque converter efficiency, performance and stability.

For example, the fluid directing elements 60, in one implementation, compensate for the axially shorter ruled blade surface so as to provide efficiency and performance equal to or greater than that of the conventional axially longer ruled blade surface. The fluid directing elements 60 provide for improved stability at stall and low speed ratios, a greater torque ratio at stall and low speed ratios, and a reduced K-factor at stall and low speed ratios. As is appreciated by those skilled in the art, the K-factor is the ratio of the input speed of the torque converter to the square root of the torque output of the engine, as measured at any torque converter operating point. In turn, the "operating point" of a torque converter is typically defined by the ratio of the output speed to the input speed which is also known as the speed ratio. It is desirable to achieve a stable K-factor across the entire speed ratio range, and to minimize a downward sloping or decreasing K-factor from stall to low speed ratios.

As will also be discussed in greater detail below, the fluid directing elements 60 are strategically positioned to improve flow of the hydraulic fluid around the profile of the blade from the pressure side to the suction side so as to reduce fluid separation. It should be appreciated that while the discussion will continue with reference to the centrifugal type three-piece (i.e., impeller, turbine and stator) torque converter 10, the exemplary stator 22 can be implemented in various types of torque converters for automotive, industrial and other applications.

Figure 2:
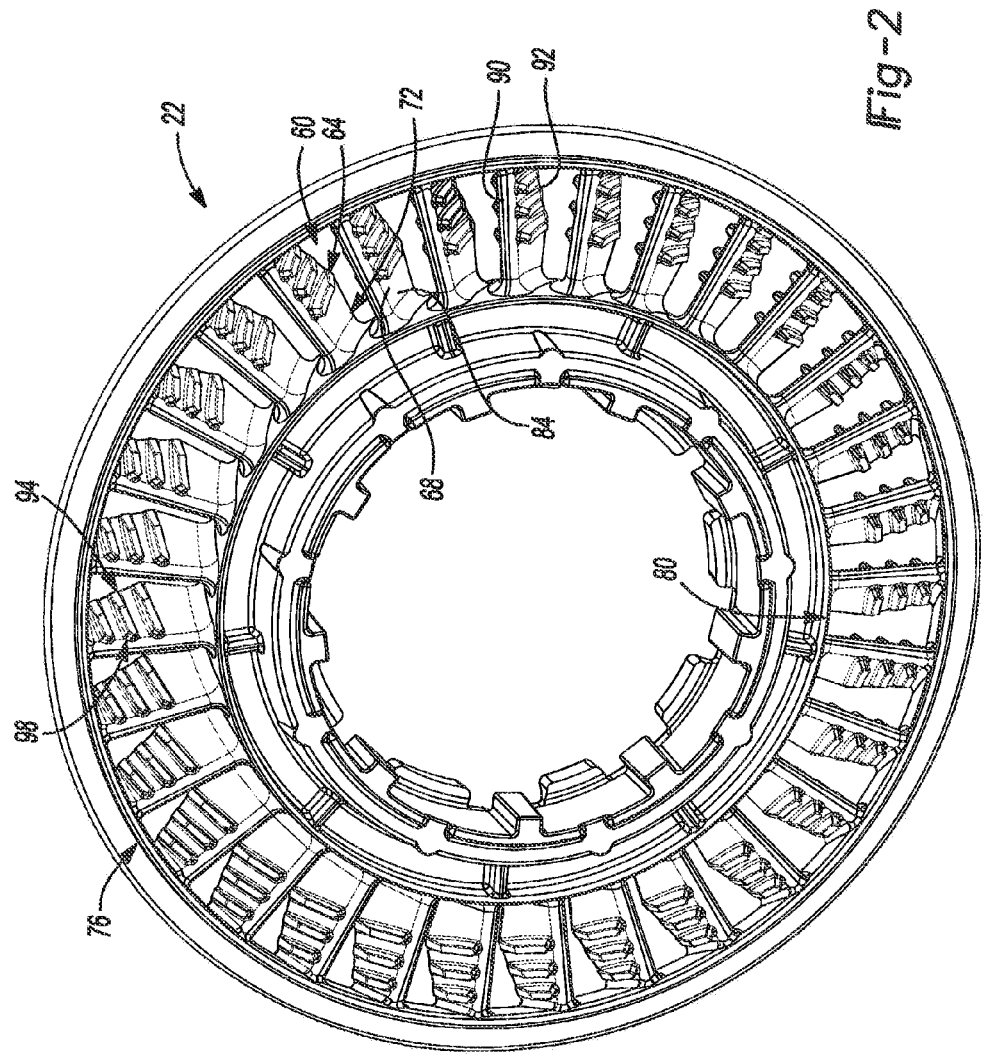
FIG. 2 is a front or pressure side view of the exemplary stator according to the principles of the present disclosure.

In the exemplary implementation shown in FIGS. 2-7, the one or more fluid directing elements 60 include one or more projections 64 extending from a surface or side 68 of one or more blades 72 of stator 22. With particular reference to FIG. 2, stator 22 includes, in one exemplary implementation, an annular outer core ring 76, an annular inner shell ring 80 and a plurality of blades 72 extending between the core and shell rings 76, 80 and circumferentially spaced around the shell ring 80. The stator 22, in the exemplary implementation illustrated, is manufactured using a casting operation as an integral or unitary component including the projections 64 such that the projections 64 include a solid structure integral with the corresponding blades 72. In one exemplary implementation, the stator 22 is formed from an aluminum alloy in a die-casting operation.

In the exemplary implementation illustrated, each blade 72 includes at least one projection 64 on both a pressure side 84 of the blade 72 and an opposed suction side 88 of the blade 72. Each of the pressure side 84 and the suction side 88 includes the blade surface 68 extending between an inlet or turbine side end or edge 90 and an outlet or impeller side end or edge 92. It should be appreciated, however, that the one or more blades 72 may alternatively be configured to include fluid directing elements 60, such as projections 64, on only the pressure side 84 or the suction side 88.

In accordance with various implementations, the projections 64 include ribs 94 having a square or substantially square shape in cross-section and are provided on each blade 72 in a group or pattern configuration 98 that includes three such ribs 94. In exemplary implementations, the ribs 94 outwardly project from the respective blade surface 68 substantially perpendicular to the blade surface 68 and are inclined or ramped relative to the central axis, as will be discussed in greater detail below. As discussed above, the grouping 98 may be provided on the pressure side 84, the suction side 88 or both the pressure and suction sides 84 and 88. Thus, while the discussion will continue with reference to both the pressure and suction sides 84, 88 including the grouping 98 of ribs 94, it will be appreciated that only one of the pressure and suction sides 84, 88 may include one or more of the fluid directing elements 60 in the form of ribs 94.

In the exemplary implementation illustrated, the grouping 98 is provided on both the pressure side 84 and the suction side 88 and includes an upper rib 104, a middle rib 108 and a lower rib 112 (collectively also referred to hereinafter as ribs 94) outwardly extending or projecting from the respective blade surface. In this implementation, the ribs 94 each include the square or rectangular or substantially square or rectangular shape 116 in cross section, as can be seen for example in FIGS. 3-6. It will be appreciated, however, that while the discussion will continue with reference to the ribs 94 having the shape 116, various shapes in cross-section for the ribs are contemplated herein, such as trapezoidal elliptical or rounded, which may be desirable for a particular torque converter application. It will also be appreciated that while the discussion will continue with reference to the groupings 98 having the same shape ribs 94, the shape of ribs 94 may vary within the groupings on one or both of the pressure side 84 and the suction side 88. An example of rounded ribs 94A in a grouping 98A similar to the grouping 98 (but for the shape of the ribs 94A) is shown in FIG. 8.

As can be seen in the various figures, the exemplary grouping 98 on both the pressure side 84 and the suction side 88 is positioned adjacent the core ring 76 such that the grouping 98 is spaced apart from the shell ring 80. In one exemplary implementation, the grouping 98 is positioned immediately adjacent the core ring 76 such that a space 124 between the upper rib 108 and the core ring 76 is less than or approximately equal to a space between any of the upper, middle or lower ribs 104, 108, 112 and is less than a space or distance 128 between the lower rib 112 and the shell ring 80. It should be appreciated, however, that other spacing for the groupings 98 may be implemented as may be desirable for different torque converter applications and/or characteristics. In the exemplary configuration illustrated, the blade surface 68 in the space 128 between lower rib 112 and shell ring 80 is smooth or substantially smooth and free of projections 64 on both the pressure and suction sides 84, 88. Similarly, the inlet and outlet side edges 90, 92 and spaces between the ribs 94 are also smooth or substantially smooth in the exemplary implementation illustrated.

Figure 3:
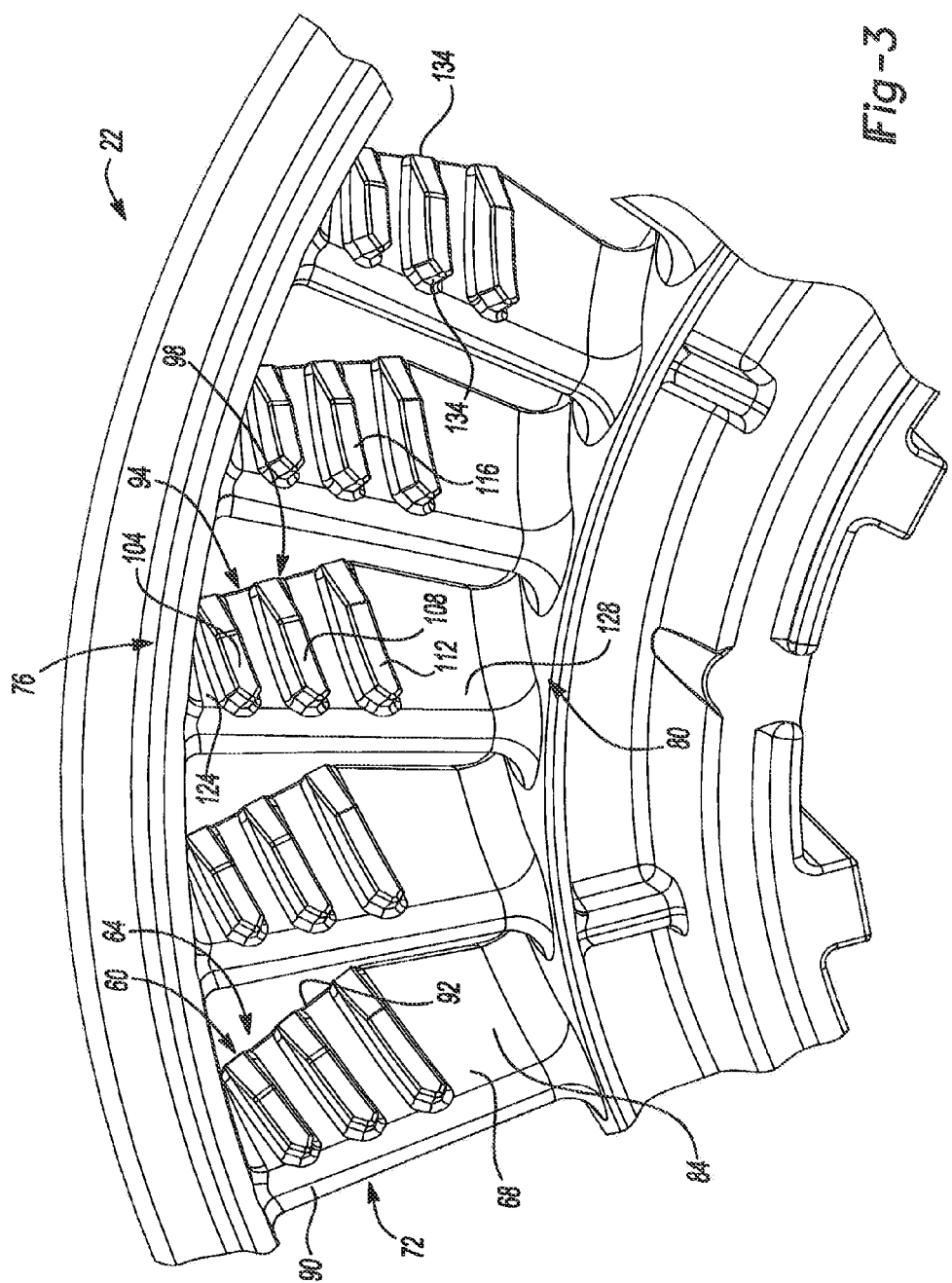
FIG. 3 is an enlarged partial view of the pressure side of an exemplary stator blade configuration according to the principles of the present disclosure.
Figure 4:
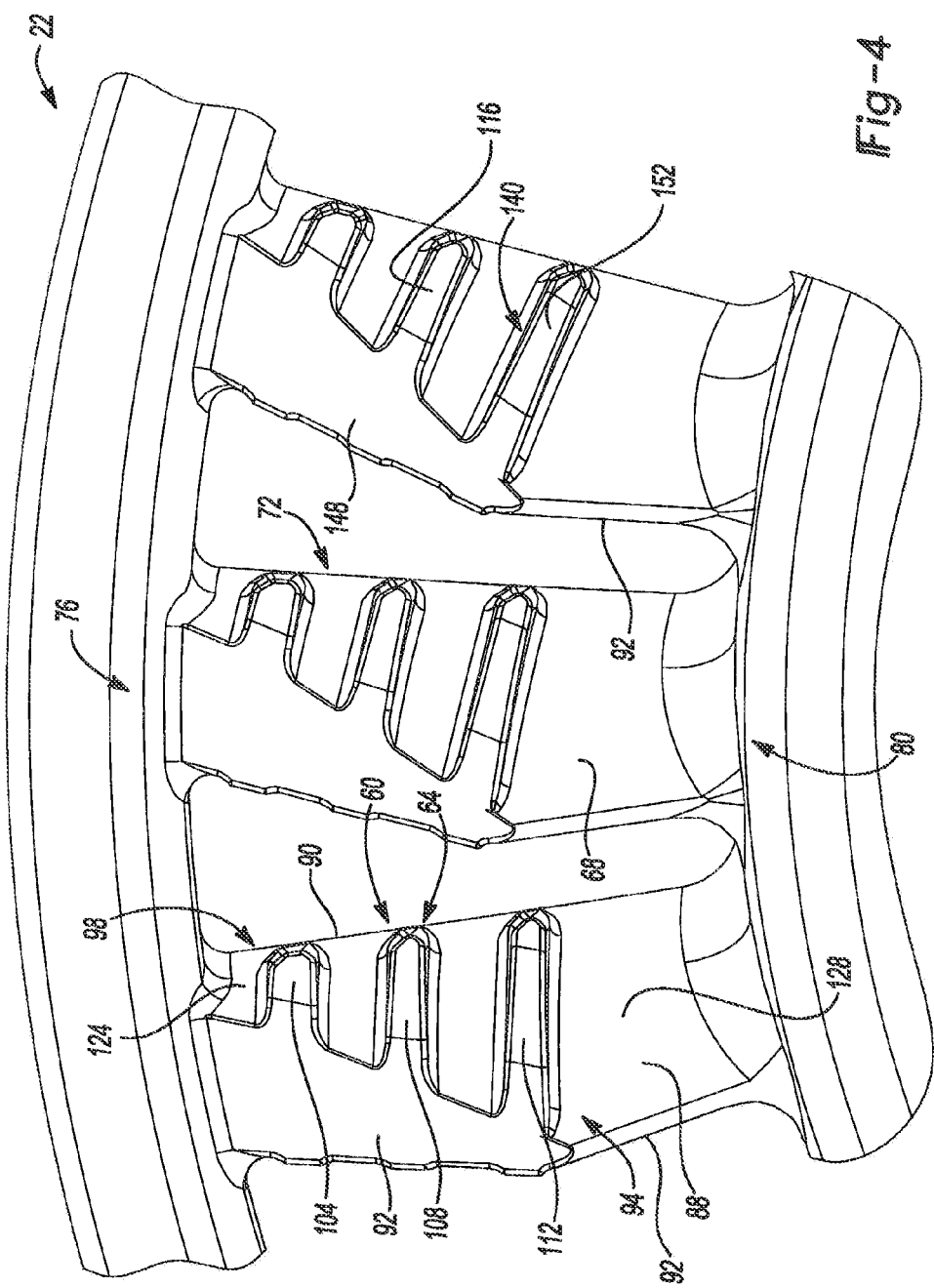
FIG. 4 is an enlarged partial view of a suction side of the exemplary stator blade configuration according to the principles of the present disclosure.
Figure 5:
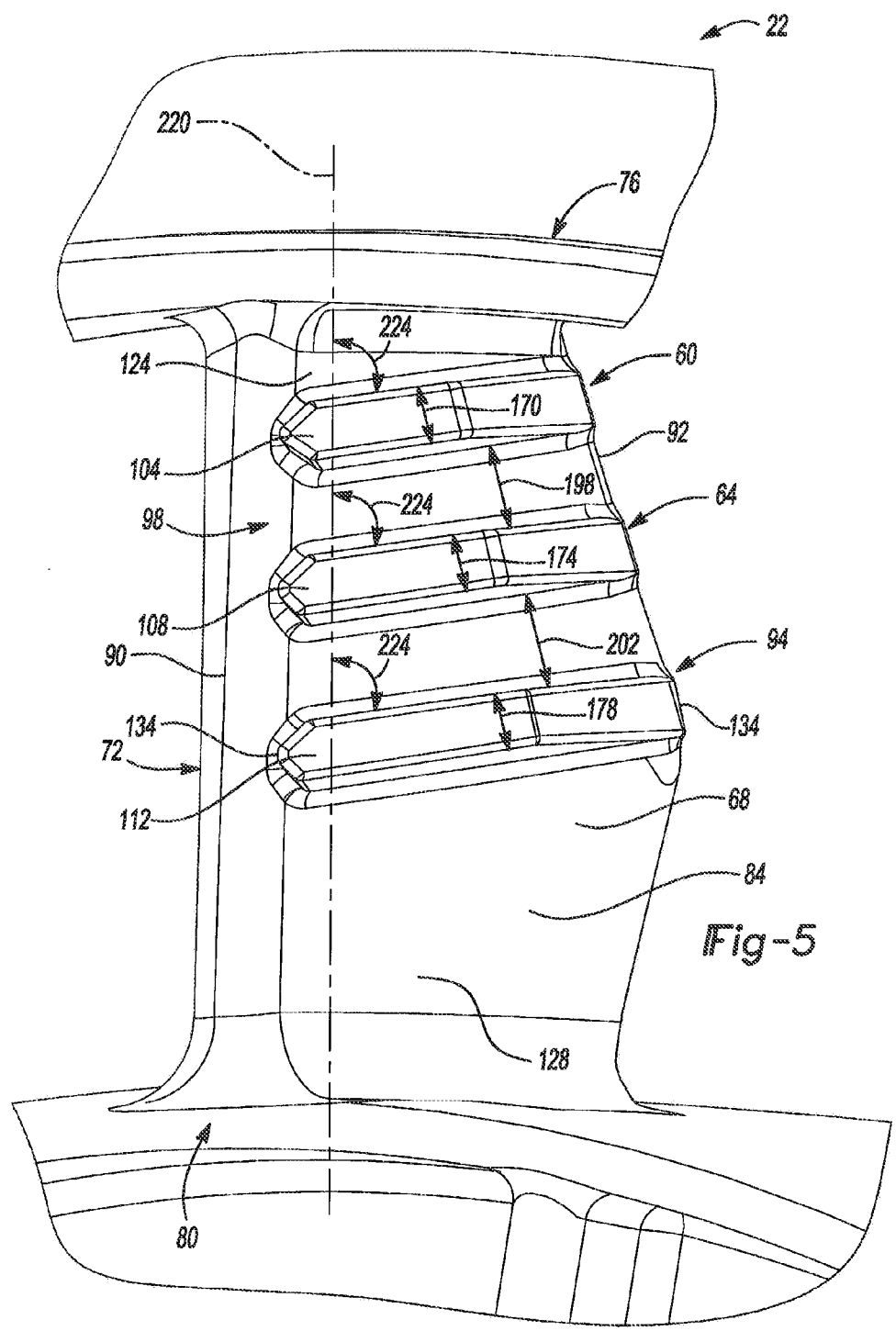
FIG. 5 is an enlarged partial view of the pressure side of a blade of the exemplary stator blade configuration of FIG. 3 having an exemplary fluid directing element configuration according to the principles of the present disclosure.
Figure 6:
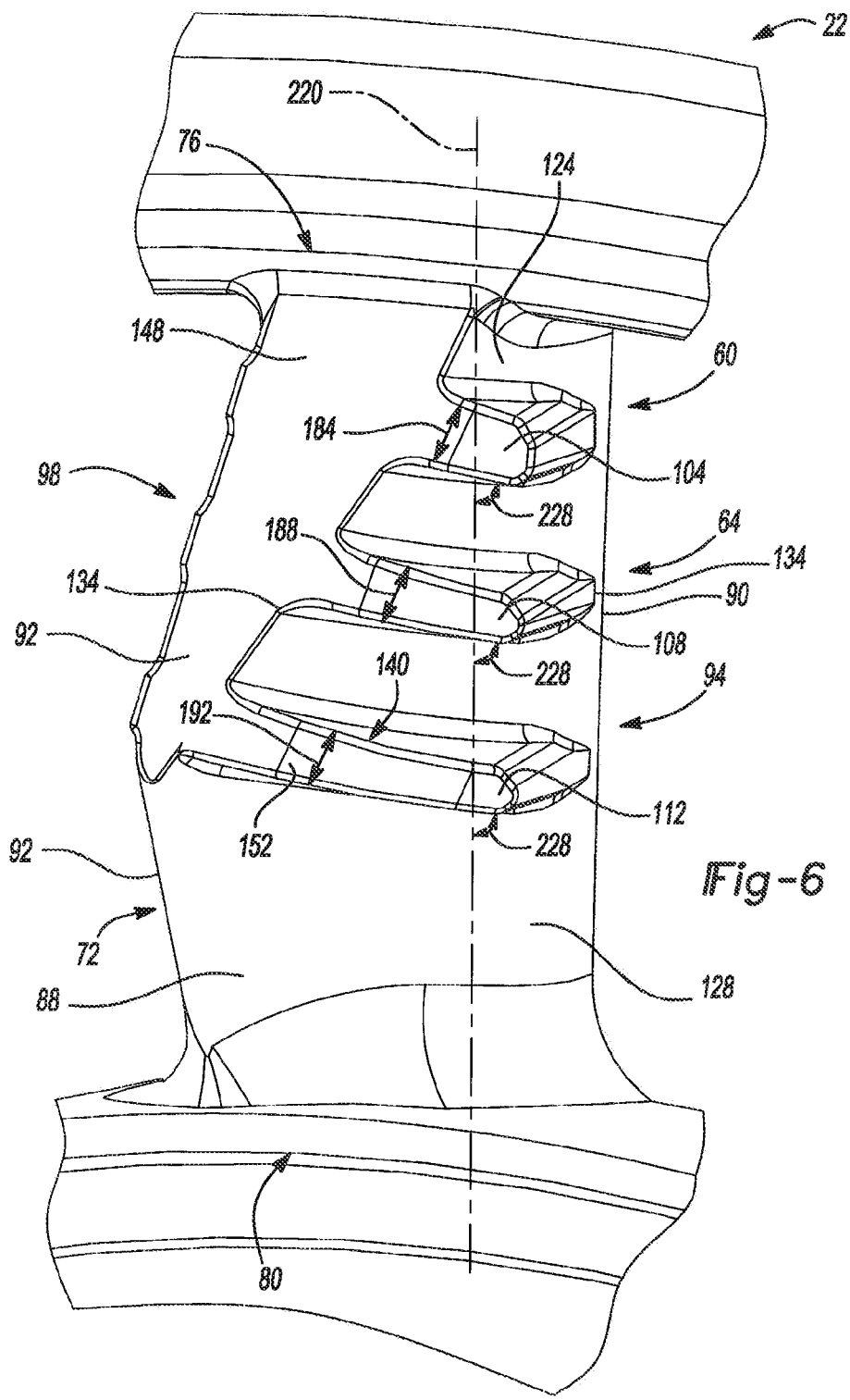
FIG. 6 is an enlarged partial view of the suction side of a blade of the exemplary stator blade configuration of FIG. 4 having an exemplary fluid directing element configuration according to the principles of the present disclosure.
Figure 7:
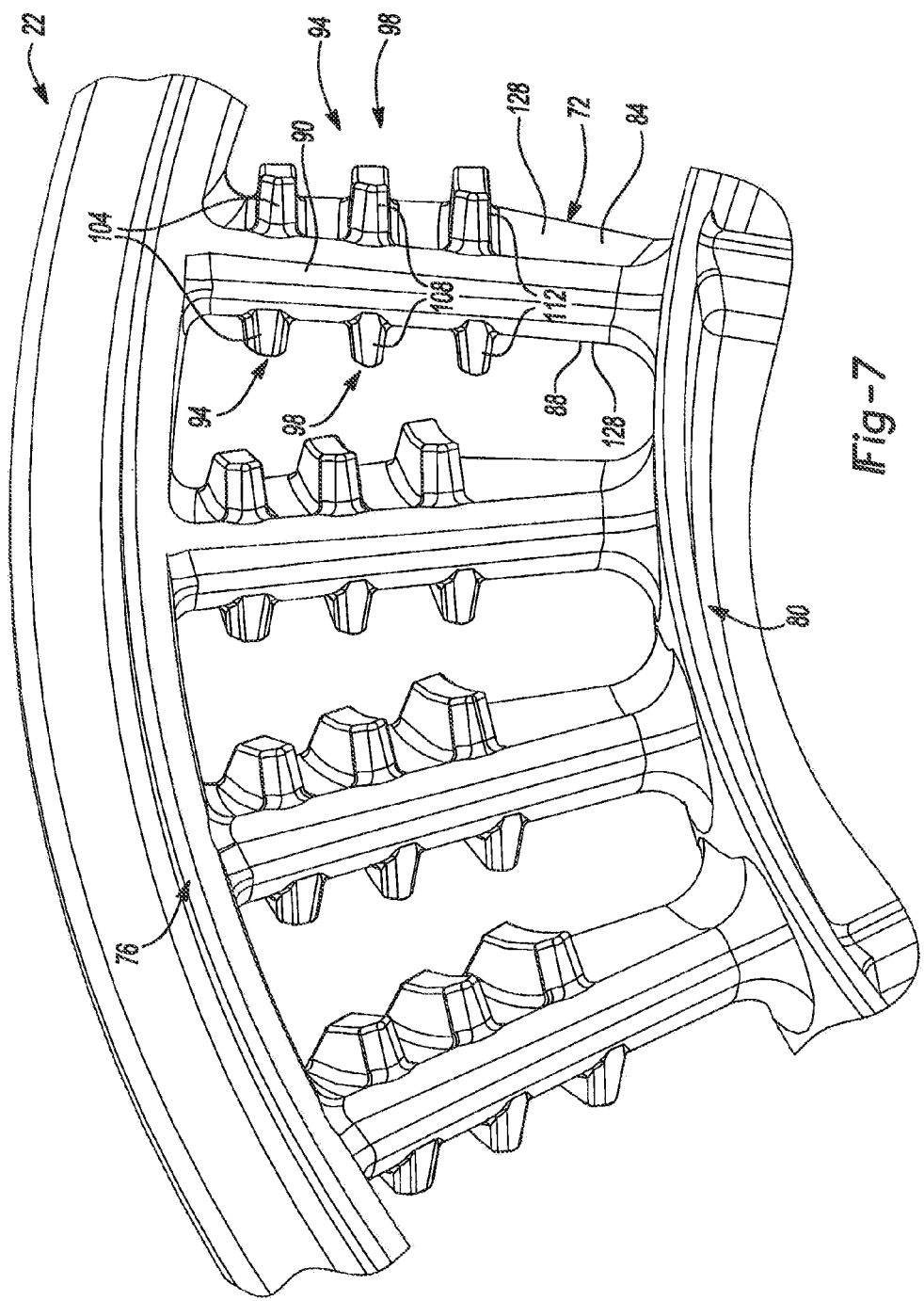
FIG. 7 is a partial view of the exemplary stator blade configuration along an axial plane of the stator blades according to the principles of the present disclosure.

In one exemplary implementation, the ribs 94 each include a longitudinal length that extends an entire or substantially an entire width of the surface 68, as shown for example in FIGS. 3 and 4. It will be appreciated that ribs 94 may alternatively include a shorter longitudinal length and/or varying longitudinal lengths. The ribs 94 may optionally include rounding and/or angling at opposed longitudinal ends 134, as shown for example in FIGS. 3-6. With particular reference to FIGS. 4 and 6, the suction side 88 ribs 94, in one exemplary implementation, each include a decreasing height 140 from the inlet side edge 90 to the outlet side edge 92. In this implementation, the height 140 may be at a maximum at the inlet side edge 90 and decrease to a height of zero at the outlet side edge 92, as shown for example in FIG. 6. In one exemplary implementation, the outlet side edge 92 includes a partially angled surface 148 that aligns with and smoothly transitions to an upper surface 152 of the suction side ribs 94, as also shown in FIG. 6. In this implementation, the upper surface 152 of the suction side ribs 94 transitions into the angled surface 148 such that at least a portion of the upper surface 152 and the angled surface 148 lie in the same plane.

The ribs 94 on the pressure side 84 and the suction side 88 are configured in the groupings 98 with particular spacing, angles and sizes to optimally influence fluid dynamics so as to improve efficiency and stability of the torque converter. Below is a discussion of one particular example of such an optimal configuration of the groupings 98 of ribs 94 with general reference to FIGS. 2-7 and particular reference to FIGS. 5 and 6.

The ribs 94 on the pressure side 84 include a thickness of 1.75-1.85 mm. In one particular implementation of ribs 94 on the pressure side 84, the upper rib 104 includes a thickness 170 of approximately 1.82-1.84 mm, the middle rib 108 includes a thickness 174 of approximately 1.80-1.82 mm, and the lower rib 112 includes a thickness 178 of approximately 1.77-1.79 mm. On the suction side 88, the ribs 94 include a thickness of 1.5-2.2 mm. In one particular implementation of ribs 94 on the suction side 88, the upper rib 104 includes a thickness 184 of approximately 2.0-2.2 mm, the middle rib 108 includes a thickness 188 of approximately 1.5-1.7 mm, and the lower rib includes a thickness 192 of approximately 1.5-1.7 mm.

In this example, the ribs 94 on pressure side 84 also include a predetermined spacing relative to each other of between 2.5 and 3.2 mm. In one particular implementation on the pressure side 84, a spacing 198 between the upper and middle ribs 104, 108 is approximately 2.5-2.7 mm and a spacing 202 between the middle and lower ribs 108, 112 is approximately 2.9-3.2 mm. On the suction side 88, the spacing of ribs 94 relative to each other is between 3.0 mm and 3.6 mm. In one particular implementation on the suction side 88, a spacing 208 between the upper and middle ribs 104, 108 is approximately 3.0-3.2 mm and a spacing 212 between the middle and lower ribs 108, 112 is approximately 3.4-3.6 mm.

As briefly discussed above, the ribs 94 on both the pressure and suction sides 84, 88 include predetermined angular orientations for optimizing fluid flow dynamics in cooperation with the above-discussed thicknesses and spacings. In general, the ribs 94 in this example are inclined or angled such that the inlet side end 134 of each of the ribs 94 on both the pressure and suction sides 84, 88 is spaced closer to the shell ring 80 than the opposed corresponding outlet side end 134 of ribs 94. The below-discussed angles are referenced against a vertical axis 220 shown in FIGS. 4 and 6. For clarification and discussion purposes only, the vertical axis 220 is parallel to a vertical plane that is perpendicular to both a horizontal plane parallel to the central axis 30 and a another plane substantially aligned with respective outer surfaces of the ribs 94. Using this reference, the ribs 94 on pressure side 84 are parallel or substantially parallel to each other and orientated at an angle 224 of between 80 and 85 degrees, and particularly at approximately 84 degrees, relative to vertical axis 220. The ribs on the suction side 88 are likewise parallel or substantially parallel to each other and orientated at an angle 228 of between 80 and 85 degrees, and particularly at approximately 82 degrees, relative to vertical axis 220.

The torque converter 10 with exemplary stator 22 provides for improved overall efficiency as well as improved stability in various operating conditions of the torque converter 10. The fluid directing elements 60, in the exemplary form of ribs 94 and configured in the manner discussed above, provide for improved fluid dynamics of the hydraulic fluid by aiding in redirection of the hydraulic fluid and reducing fluid separation as the hydraulic fluid is redirected by the stator blades 72. As a result, the exemplary stator 22 discussed herein compensates for the axially shorter ruled blade surface so as to provide an efficiency equal to or greater than that of the conventional axially longer ruled blade surface without the fluid directing elements while also improving both the K-factor (reduced) and torque ratio (increased) at both stall and low speed ratios.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A stator for use with a torque converter, the stator comprising:
    an inner annular shell and an outer annular core spaced apart from the inner annular shell;
    a plurality of stator blades disposed around the inner annular shell in a spaced part configuration and radially extending to the outer annular core, each stator blade including an inlet-side edge, an opposed outlet-side edge, a pressure-side surface extending between the inlet-side and outlet-side edges and an opposed suction-side surface extending between the inlet-side and outlet-side edges; and
    pressure-side and suction-side fluid directing projections outwardly projecting from the pressure-side and suction-side surfaces, respectively, in spaced relation to each other and each extending between the inlet-side and outlet-side edges;
    wherein the fluid directing projections are adapted to aid in redirecting torque converter fluid returning from a turbine and reducing fluid separation as the fluid interacts with the stator blades and associated fluid directing projections thereby increasing efficiency and improving performance of the torque converter; and
    wherein the pressure-side fluid directing projections comprise a pressure-side pattern of three projections grouped together, wherein the suction-side fluid directing projections comprise a suction-side pattern of three projections grouped together, and wherein the pressure-side and suction-side patterns of three projections are each positioned as a group closer to the outer annular core than the inner annular shell.

2. The stator of claim 1, wherein the pressure-side and suction-side fluid directing projections extend substantially linearly between the inlet-side and outlet-side edges.

3. That stator of claim 2, wherein the pressure-side and suction-side fluid directing projections are inclined relative to a central axis of rotation of the stator such that an inlet-side end of each of the projections is positioned closer to the inner annular shell than an opposed outlet-side end.

4. The stator of claim 2, wherein each of the pressure-side and suction-side fluid directing projections comprise a rib having a substantially square shape in cross-section and extending across the respective surfaces from the inlet-side edge to the outlet-side edge.

5. The stator of claim 2, wherein the pressure-side projections are substantially parallel to each other and the suction-side fluid directing projections are substantially parallel to each other, and wherein each of the pressure-side projections are substantially aligned with a corresponding suction-side projection.

6. The stator of claim 1, wherein the pressure-side pattern of three projections is substantially aligned with the suction-side pattern of three projections.

7. The stator of claim 1, wherein the suction-side projections each include a decreasing outwardly extending height relative to the suction-side surface from the inlet-side edge to the outlet-side edge such that each suction-side projection includes a maximum height at the inlet-side edge and a minimum height at the outlet-side edge substantially aligned with a surface of the outlet-side edge.

8. The stator of claim 1, wherein the inlet-side and outlet-side edges and a remaining portion of the pressure-side and suction-side surfaces that include an absence of the pressure-side and suction-side patterns of projections comprise substantially smooth surfaces.

9. The stator of claim 1, wherein each projection of the pressure-side and suction-side patterns of projections includes a thickness of between 1.5 mm and 2.2 mm and a relative spacing between adjacent projections in the patterns of projections of between 2.5 mm and 3.2 mm.

10. The stator of claim 1, wherein the pressure-side and suction-side patterns of fluid directing projections are configured to aid in redirecting torque converter fluid returning from the turbine and reducing fluid separation relative to the suction-side surfaces of the blades as the fluid travels relative to the projections around a profile of the blades from the pressure-side to the suction-side thereby increasing the torque converter efficiency, reducing the torque converter K-factor at stall and low speed ratio operating conditions, and increasing the torque converter torque ratio at stall and low speed ratio operating conditions.

11. A centrifugal torque converter for a transmission, comprising:
    a turbine;
    an impeller;
    a stator positioned between the turbine and the impeller;
    a plurality of blades extending within the stator between an inner annular shell and an outer annular core, each blade including an inlet-side edge, an opposed outlet-side edge, a pressure-side surface extending between the inlet-side and outlet-side edges and an opposed suction-side surface extending between the inlet-side and outlet-side edges; and
    a pressure-side fluid directing rib and a suction-side fluid directing rib, each rib outwardly projecting from the respective pressure-side and suction-side surfaces and extending between the inlet-side and outlet-side edges;

wherein the fluid directing ribs are configured to aid in redirecting torque converter fluid returning from the turbine to the impeller and reducing fluid separation as the returning fluid interacts with the stator blades and associated fluid directing ribs thereby increasing efficiency and improving performance of the torque converter; and wherein the pressure-side fluid directing rib and the suction-side fluid directing rib each comprise a pattern of three ribs grouped together and positioned in spaced relation to each other the pattern of suction-side ribs and the pattern of pressure-side ribs each positioned adjacent to the outer annular core and closer to the outer annular core than the inner annular shell.

12. The torque converter of claim 11, wherein the ribs of the pressure-side and suction-side patterns of ribs are substantially parallel to each other and inclined relative to a central axis of rotation of the stator such that an inlet-side end of each of the ribs is positioned closer to the inner annular shell than an opposed outlet-side end, and wherein each rib of the pressure-side pattern is substantially aligned with each corresponding rib of the suction-side pattern.

13. The torque converter of claim 11, wherein the pressure-side and suction-side fluid directing ribs each include a substantially square shape in cross-section and extend across the associated blade surface from the inlet-side edge to the outlet-side edge.

14. The torque converter of claim 11, wherein the suction-side ribs each include a decreasing outwardly projecting height relative to the suction-side surface from the inlet-side edge to the outlet-side edge such that each suction-side rib includes a maximum height at the inlet-side edge and a minimum height at the outlet-side edge substantially aligned with a surface of the outlet-side edge.

15. The torque converter of claim 11, wherein the inlet-side and outlet-side edges and a remaining portion of the pressure-side and suction-side surfaces that include an absence of the pressure-side and suction-side patterns of ribs comprise substantially smooth surfaces.

16. The torque converter of claim 11, wherein the pressure-side and suction-side patterns of fluid directing ribs are configured to aid in redirecting torque converter fluid returning from the turbine and reducing fluid separation relative to the suction-side surface as the fluid travels relative to the ribs around a profile of the blades from the pressure-side to the suction-side thereby increasing the torque converter efficiency, reducing the torque converter K-factor at stall and low speed ratio operating conditions, and increasing the torque converter torque ratio at stall and low speed ratio operating conditions.

* * * * *